United States Patent [19]

Arai

[11] Patent Number: 5,613,220
[45] Date of Patent: Mar. 18, 1997

[54] RADIO COMMUNICATION APPARATUS

[75] Inventor: Shunji Arai, Yokohama, Japan

[73] Assignee: Canon Kabushiki Kaisha, Tokyo, Japan

[21] Appl. No.: 310,253

[22] Filed: Sep. 21, 1994

[30] Foreign Application Priority Data

Sep. 28, 1993 [JP] Japan ................................. 5-264274
Aug. 5, 1994 [JP] Japan ................................. 6-184364

[51] Int. Cl.⁶ ........................................................ H04B 1/38
[52] U.S. Cl. ........................... 455/88; 455/127; 455/343; 379/58
[58] Field of Search ........................... 455/88, 89, 90, 455/127, 350, 349, 343; 379/58, 61, 420, 422, 424, 432; 320/3, 5

[56] References Cited

U.S. PATENT DOCUMENTS

| 4,726,052 | 2/1988 | Kato et al. | 455/127 |
| 5,029,233 | 7/1991 | Metroka | 455/54.1 |
| 5,191,277 | 3/1993 | Ishikura et al. | 455/89 |
| 5,228,074 | 7/1993 | Mizikovsky | 455/88 |

*Primary Examiner*—Chi H. Pham
*Attorney, Agent, or Firm*—Morgan & Finnegan, L.L.P.

[57] ABSTRACT

A radio communication apparatus which is charged by a charge table comprises a connection unit to connect another communication apparatus, a radio communication unit to communicate a communication signal of another communication apparatus through a radio line, and a control unit to finish or continue the communication by the radio communication unit in accordance with whether another communication apparatus has been connected to the connection unit or not when the apparatus is connected to the charge table.

15 Claims, 8 Drawing Sheets

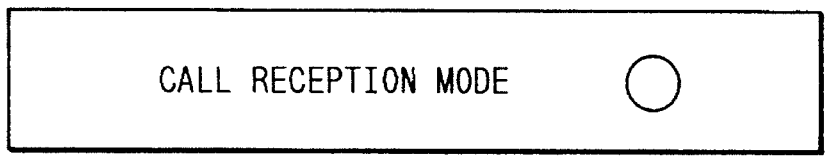
CALL RECEPTION MODE SELECTION DISPLAY
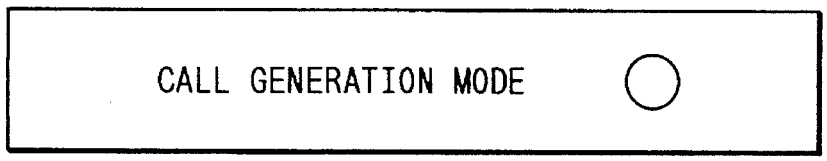
CALL GENERATION MODE SELECTION DISPLAY
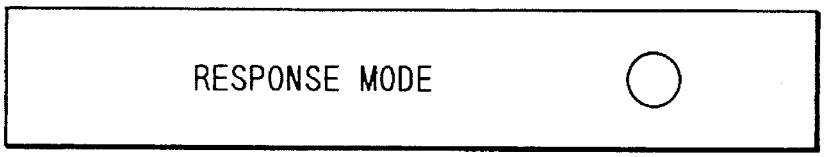
RESPONSE MODE SELECTION DISPLAY

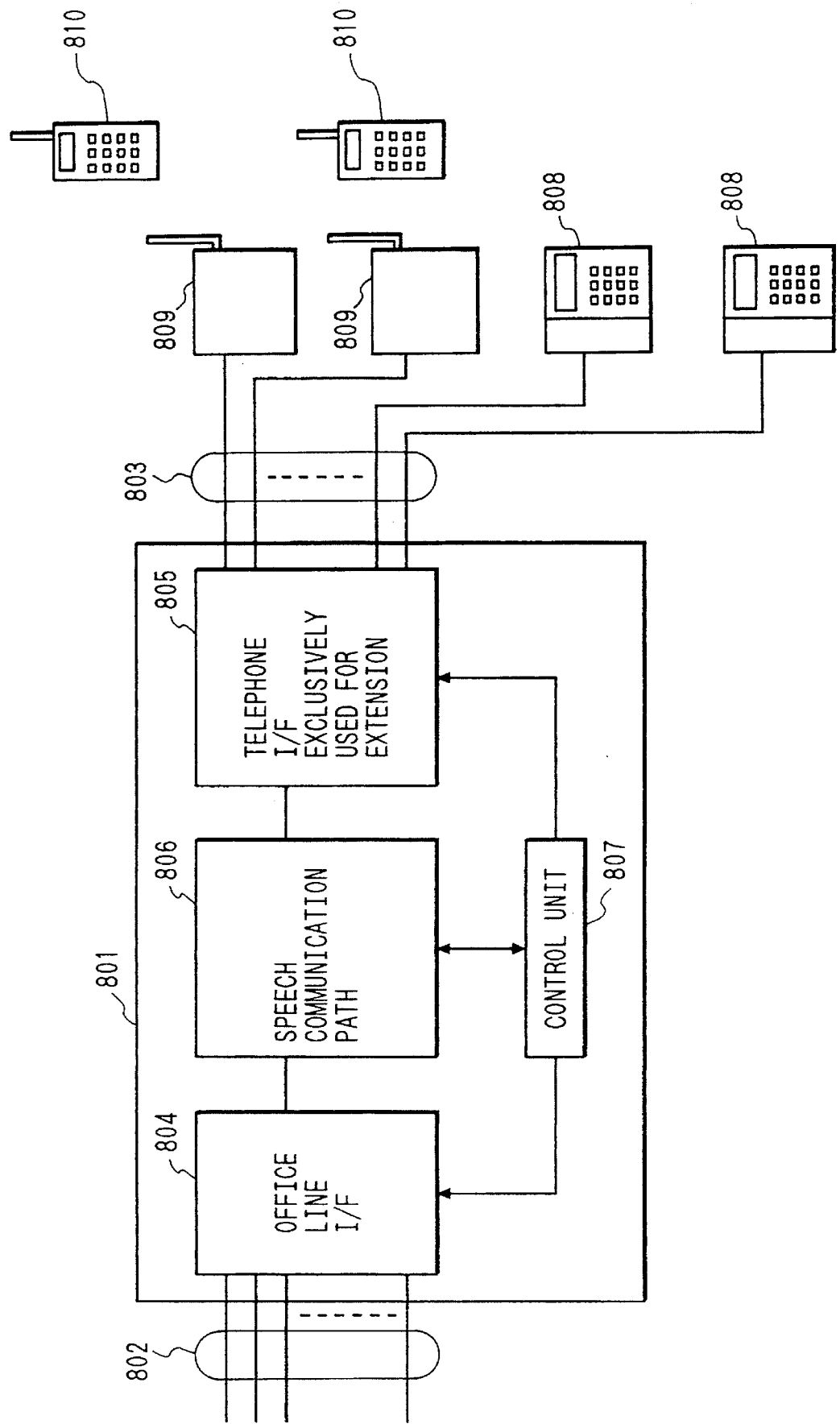

RADIO COMMUNICATION APPARATUS

BACKGROUND OF THE INVENTION

1. Field of the Invention

The present invention relates to a radio communication apparatus that is charged by a charge table.

2. Related Background Art

In a conventional radio telephone apparatus, when a slave telephone is put on a charge table during a speech communication, a speech communication is automatically disconnected.

In a radio telephone apparatus to which an external handset can be connected, however, even when the external handset is connected, no speech communication can be performed in a state in which the radio telephone apparatus is put on the charge table.

Even when a portable facsimile apparatus or the like is connected to an external handset connection unit of a radio telephone apparatus and is used, on the other hand, such a facsimile apparatus has to be released from the charge table in order to connect to a line.

Further, there is also a similar problem in a radio telephone apparatus to which a data terminal equipment can be connected.

SUMMARY OF THE INVENTION

It is an object of the invention to improve an operability of a radio communication apparatus.

Another object of the invention is to provide a radio communication apparatus in which, in the case where an external communication apparatus is connected and a communication is being executed, the communication is executed while receiving a power supply from a charge table.

Still another object of the invention is to provide a radio communication apparatus in which when it is put on a charge table, a communication is finished or continued in accordance with whether an external communication apparatus has been connected or not.

Further another object of the invention is to optimize a current to charge a communication apparatus.

Further another object of the invention is to provide a charging apparatus in which when a communication apparatus is charged, a charging current is controlled in accordance with a state of the communication apparatus.

The above and other objects and features of the present invention will become apparent from the following detailed description and the appended claims with reference to the accompanying drawings.

BRIEF DESCRIPTION OF THE DRAWINGS

FIGS. 7A to 7C are explanatory diagrams showing display screens in a mode setting process in the third embodiment; and FIG. 8 is a block diagram showing a system construction according to the fourth embodiment of the invention.

DETAILED DESCRIPTION OF THE PREFERRED EMBODIMENTS

Figure 1:
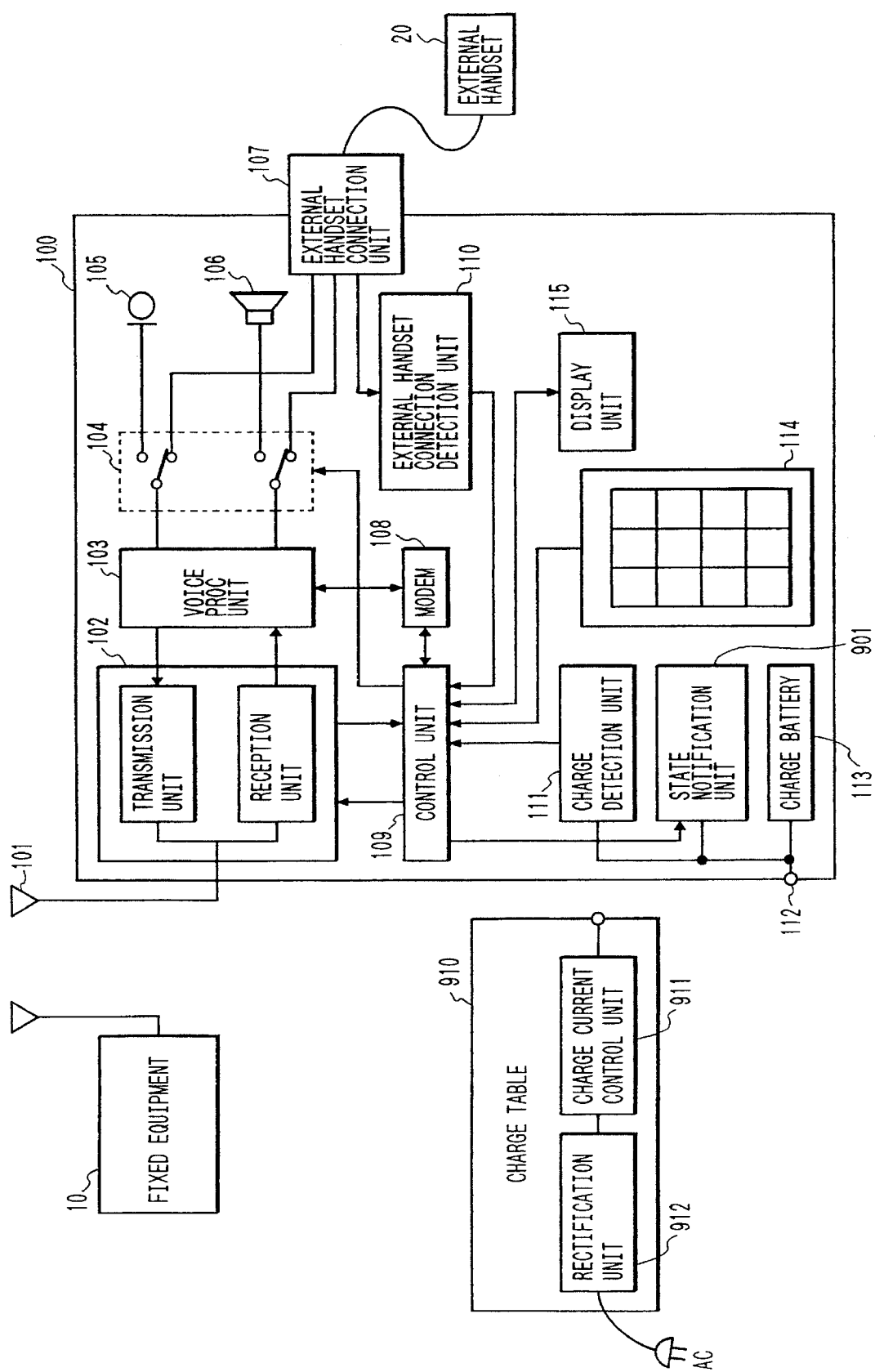
FIG. 1 is a block diagram showing a radio telephone apparatus of the first embodiment of the invention.

FIG. 1 is a block diagram showing a radio telephone apparatus 100 in the first embodiment of the invention.

The radio telephone apparatus 100 comprises: an antenna 101 for transmitting and receiving a radio wave to/from a fixed equipment 10; a transmission and reception unit 102 for modulating a voice and data to be transmitted to the fixed equipment 10 and for demodulating the voice and data from the fixed equipment 10; a voice processing unit 103 for performing an amplification or the like of the voice to be transmitted and received; a voice switching unit 104 for switching a voice signal to a transmitter 105 and a receiver 106 or to an external handset 20 which is connected to an external handset connection unit 107; a modem 108 for sending a data signal from the fixed equipment 10 to a control unit 109 and for transmitting the data signal from the control unit 109 to the fixed equipment 10; the control unit 109 for controlling the transmission and reception unit 102 and modem 108, for accepting an input from a key pad 114, and for controlling the voice switching unit 104 by a notification from an external handset connection detection unit 110; the external handset connection detection unit 110 for detecting that the external handset 20 has been connected to the external handset connection unit 107, thereby notifying to the control unit 109; a charge detection unit 111 for detecting that a charge table 910 has been connected to the charge table connection unit 112, thereby notifying to the control unit 109; a charge battery 113; the key pad 114 for inputting various data such as a dial number and the like; a display unit 115 for displaying various information such as a dial number and the like; and a state notification unit 901 for notifying a use state to the charge table 910.

Reference numeral 910 denotes the charge table having a charge current control unit 911 for controlling a charge current and a rectification unit 912 for converting an alternating current to a direct current.

The operation of the embodiment will now be described with reference to a flowchart for each process.

Figure 2:
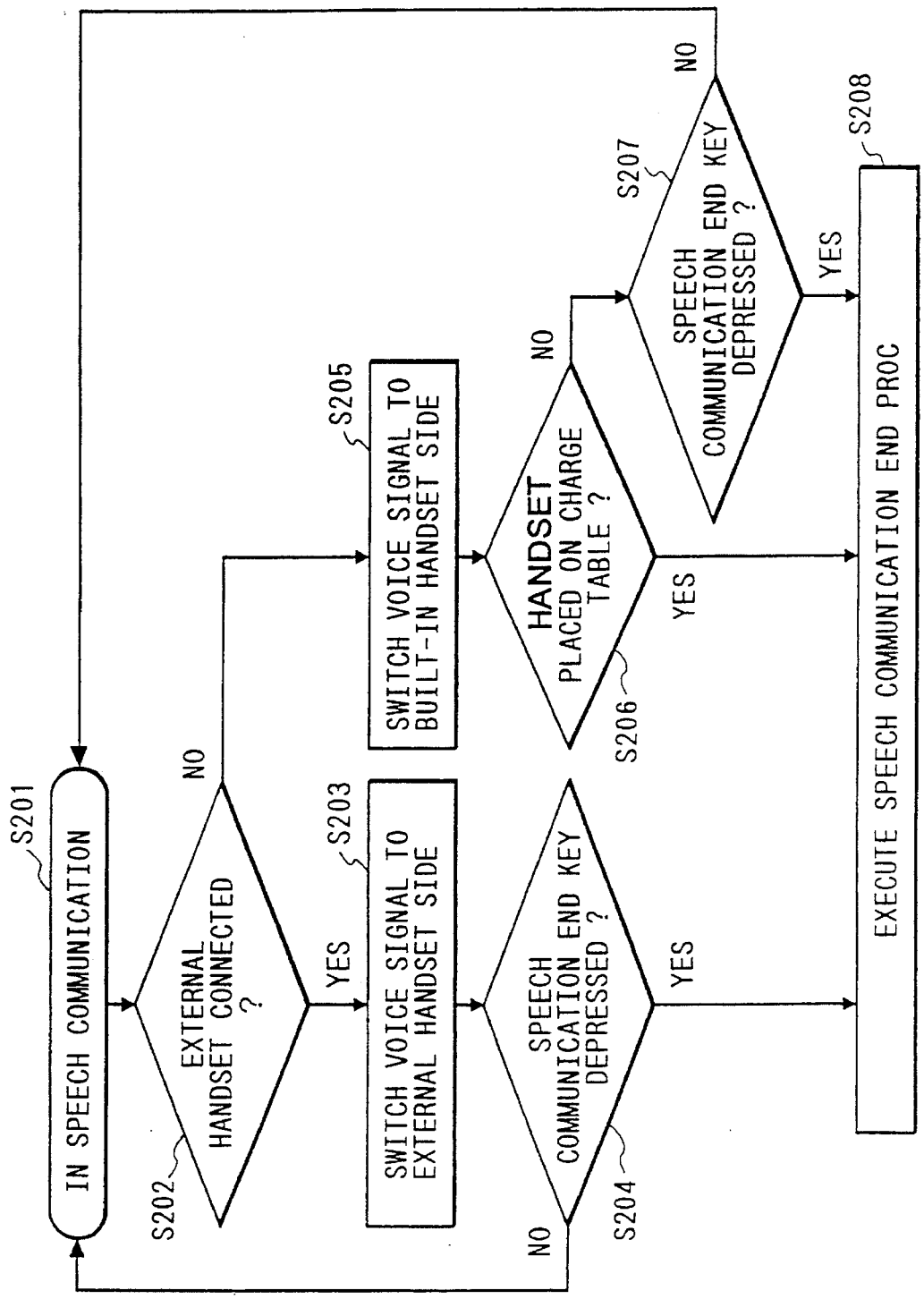
FIG. 2 is a flowchart showing a speech communication end process in the first embodiment.

FIG. 2 is a flowchart showing a speech communication end process of the control unit 109 in the embodiment.

First, in a speech communication state (S201), when it is detected that the external handset 20 has been connected (S202), the voice switching unit 104 is controlled, thereby connecting a voice signal to the external handset 20 side (S203). In this case, only when a speech communication end key in the key pad 114 is depressed (S204), a speech communication end process is executed (S208), thereby avoiding that information regarding whether the apparatus has been put on the charge table 910 or not is concerned with the speech communication end process. After completion of the speech communication end process, the control mode is set into a stand-by mode.

When it is detected that the external handset 20 is not connected (S202), the voice signal is connected to the built-in transmitter 105 and receiver 106 (S205). In this case, in step S208, the speech communication end process is executed in both of a case where the handset has been put on the charge table 910 (S206) and a case where the speech communication end key in the key pad 114 has been depressed (S207).

When the radio telephone apparatus 100 is put on the charge table 910 in a communicating state, in case of continuing the communication even when the radio telephone apparatus 100 is put on the charge table 910, the communication is continued and the state notification unit 901 notifies a state in speech communication to the charge current control unit 911.

In response to such a notification, the charge current control unit 911 supplies a current larger than a current in a stand-by state of the radio telephone apparatus 100. When the radio telephone apparatus 100 finishes the communication, the state notification unit 901 notifies the charge current control unit 911 of the fact that no communication is being executed.

In response to such a notification, the charge current control unit 911 supplies the charge current for the stand-by mode. The embodiment has been described here as an example with respect to two modes of the communication mode and stand-by mode and two charge currents corresponding to them. The invention can be also applied to a case of an arbitrary number of communication modes and charge currents.

Figure 3:
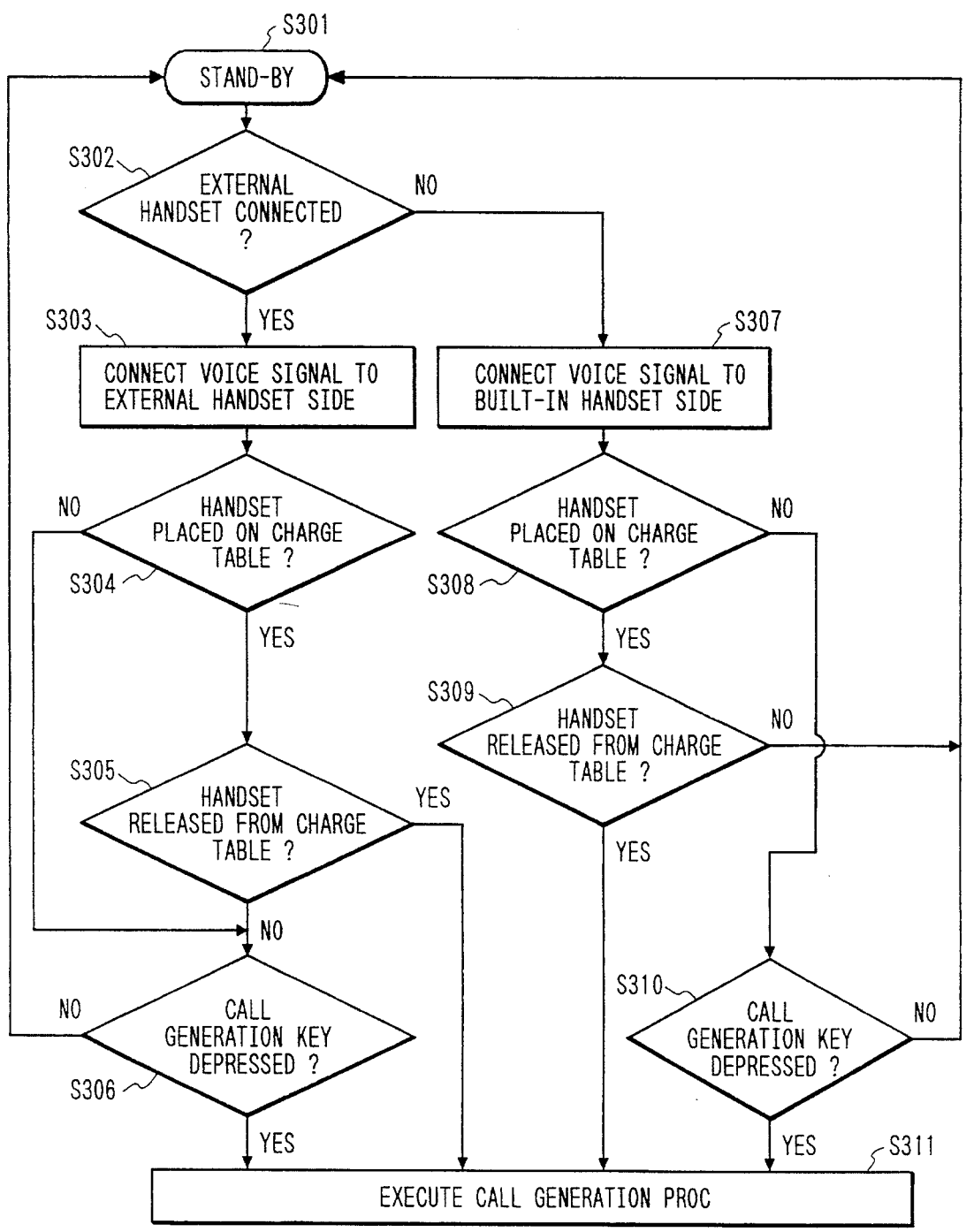
FIG. 3 is a flowchart showing a call generating process in the first embodiment.

FIG. 3 is a flowchart showing a call generation process of the control unit 109 in the embodiment.

First, in the stand-by mode (S301), when it is detected that the external handset 20 has been connected (S302), the voice signal is connected to the external handset 20 side (S303). In this case, when the handset is put on the charge table 910 (S304), by releasing the handset from the charge table 910 (S305) or by depressing a call generation key (S306), a call generating process is executed (S311). When the handset is not put on the charge table 910, by depressing the call generation key (S306), the call generating process is executed.

On the other hand, when it is detected that the external handset 20 is not connected (S302), the voice signal is connected to the built-in transmitter 105 and receiver 106 (S307). In this case, a check is made to see if the handset has been put on the charge table 910 or not (S308). When it is put on the charge table, by detecting that the handset has been released from the charge table 910 (S309), the call generating process is performed (S311). When the handset is not put on the charge table 910, by depressing the call generation key in the key pad 114 (S310), the call generating process is executed (S311).

Figure 4:
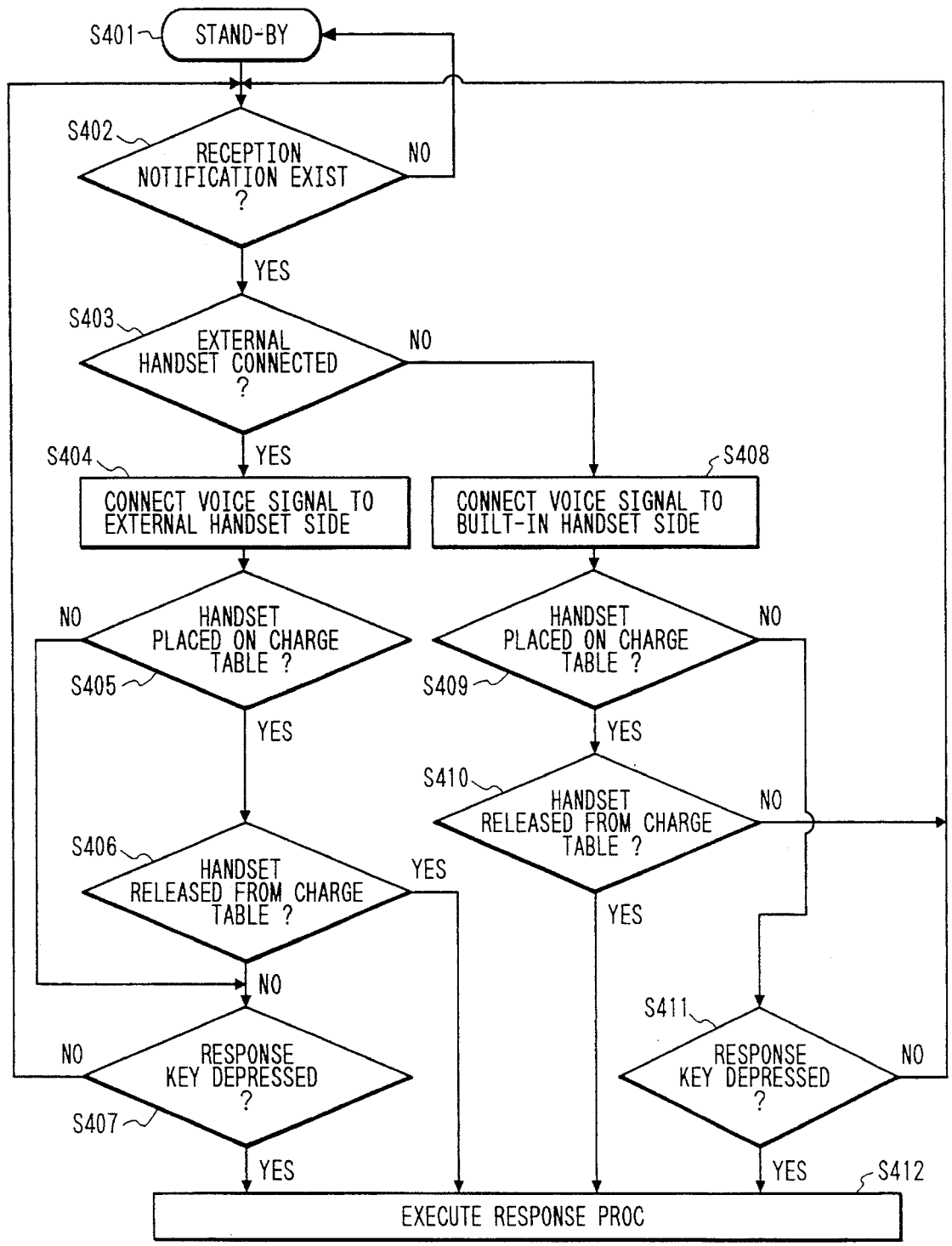
FIG. 4 is a flowchart showing a call reception responding process in the first embodiment.

FIG. 4 is a flowchart showing a call reception responding process in the control unit 109 of the embodiment.

First, when there is a reception notification (S402) in the stand-by mode (S401), a check is made to see if the external handset 20 has been connected or not (S403). When the handset is connected, the voice signal is connected to the external handset 20 side (S404).

In this case, when the handset is put on the charge table 910 (S405), by releasing the handset from the charge table 910 (S406) or by depressing a response key (S407), the responding process is performed (S412). When the handset is not put on the charge table 910, by depressing the response key (S407), the call generating process is executed (S412).

In the case where the external handset 20 is not connected, the voice signal is connected to the built-in transmitter 105 and receiver 106 (S408). A check is made to see if the handset has been put on the charge table 910 or not (S409). If YES, by detecting that the handset has been released from the charge table 910 (S410), the responding process is performed (S412). When the handset is not put on the charge table 910, by depressing the response key in the key pad (S411), the responding process is executed (S412).

The second embodiment of the invention will now be described.

Figure 5:
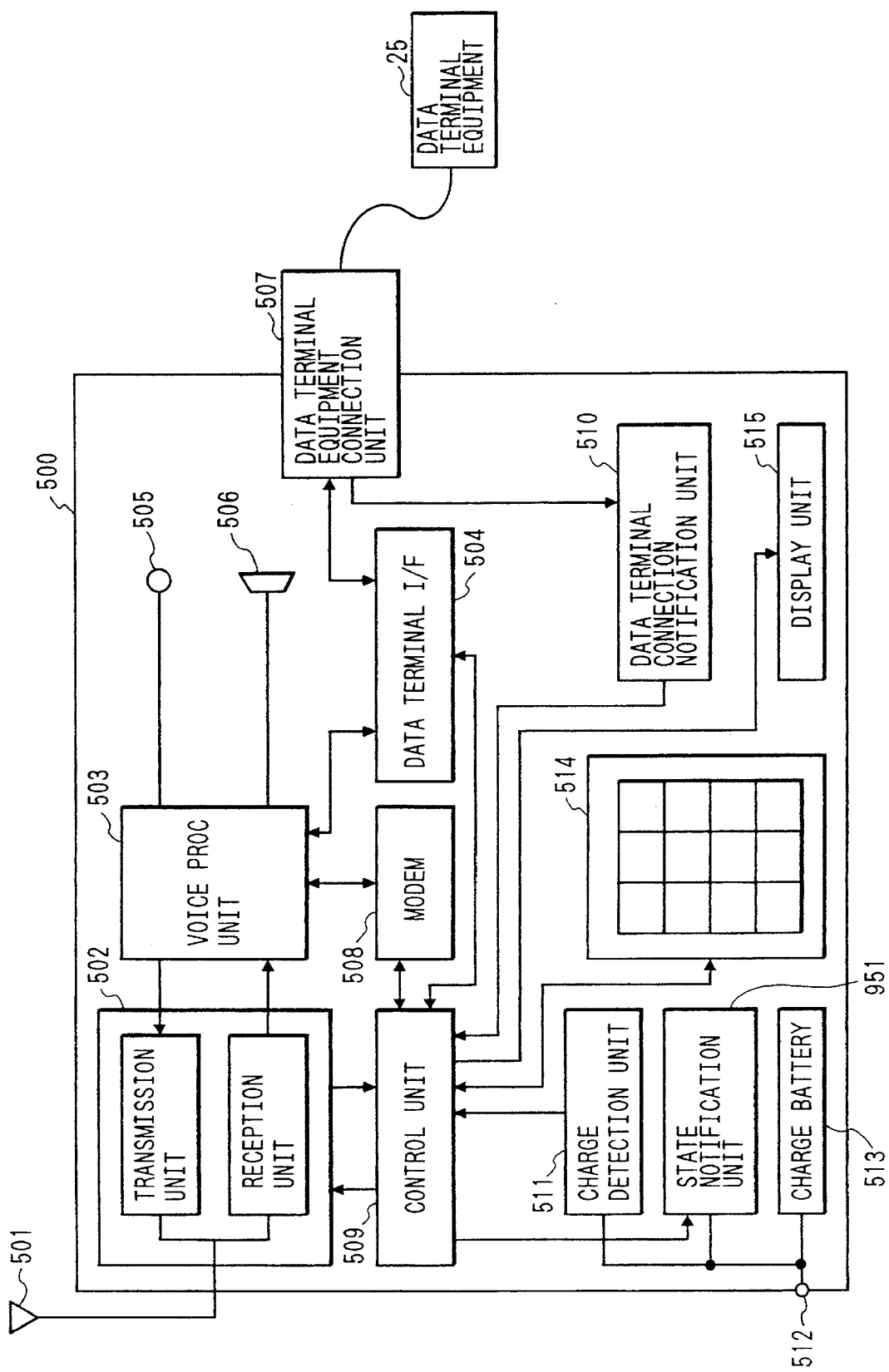
FIG. 5 is a block diagram showing a radio telephone apparatus in the second embodiment of the invention.

FIG. 5 is a block diagram showing a radio telephone apparatus of the second embodiment.

A radio telephone apparatus 500 comprises: a data terminal interface 504 for enclosing a data terminal equipment 25; a connection unit 507 for connecting the data terminal equipment 25; and a data terminal connection notification unit 510 for detecting that the data terminal equipment 25 has been connected and for notifying to a control unit 509.

Reference numerals 501 to 503, 505, 506, 508, 509, 511 to 515, and 951 shown in FIG. 5 denote component elements having the same names and substantially the same functions as those of the component elements 101 to 103, 105, 106, 108, 109, 111 to 115, and 901 shown in FIG. 1, respectively. Therefore, their descriptions are omitted here.

In the second embodiment, data from the data terminal equipment 25 is sent to control unit 509 through the data terminal interface 504 and is also transmitted to the fixed equipment through a voice processing unit 503 and a transmission and reception unit 502.

Data to the data terminal equipment 25 passes through the transmission and reception unit 502 and voice processing unit 503 and is processed by the data terminal interface 504. After that, the processed data is sent to the data terminal equipment 25.

The other operations are similar to those in the case where the external handset 20 in the above first embodiment is replaced by the data terminal equipment 25. In each of the flowcharts for the speech communication end, call generation, and reception response shown in FIGS. 2 to 4, by replacing the voice signal to the external handset 20 by the data signal and by replacing the external handset 20 by the data terminal equipment 25, the operation in the second embodiment is obtained.

The third embodiment of the invention will now be described.

In the third embodiment, whether a speech communication disconnecting operation in each of the foregoing embodiments is executed or not or whether the call generating operation and a reception responding operation are enabled to be performed or not can be preset by a predetermined operation of the radio telephone apparatus.

Figure 6:
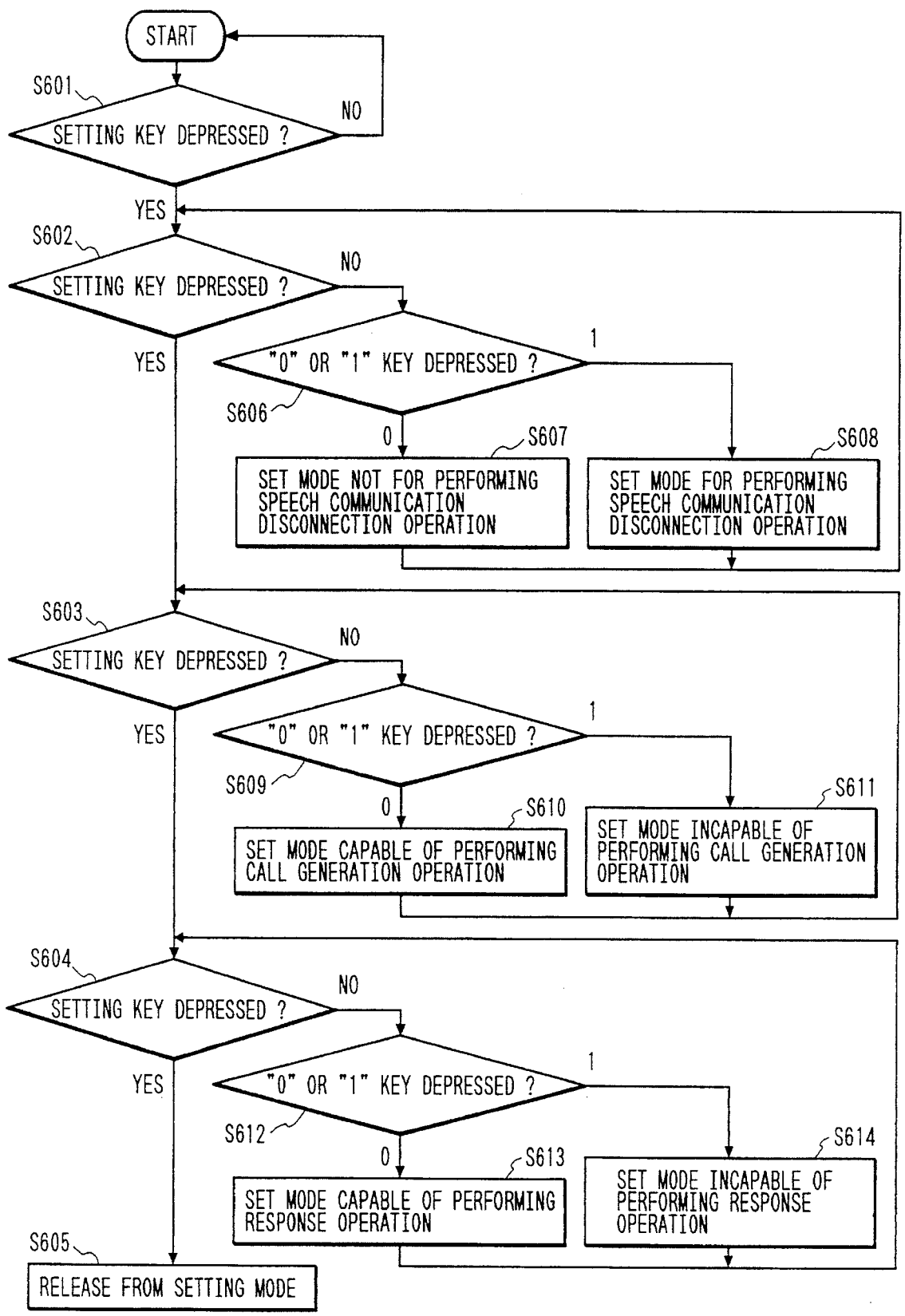
FIG. 6 is a flowchart showing a mode setting process in the third embodiment of the invention.

FIG. 6 is a flowchart showing such a presetting process. FIGS. 7A to 7C are explanatory diagrams showing a transition of the display upon setting. A construction of the third embodiment is substantially common to that of FIG. 1.

First, when a setting key in the key pad 114 is depressed (S601), a display to select a disconnection mode appears on the display unit 115 (FIG. 7A). By inputting "0" here (S606), a mode such that when it is detected that the external handset 20 has been connected as mentioned above, even if the handset is put on the charge table 910 in a speech communicating state, the speech communication disconnecting operation is not executed is set (S607).

By inputting "1" (S606), a mode such that even when it is detected that the external handset 20 has been connected, the speech communication disconnecting operation is executed so long as the handset is put on the charge table 910 in the speech communicating state is executed (S608).

By further depressing the setting key (S602), a display to select the call generation mode appears on the display unit 115 (FIG. 7B). Now, by inputting "0" (S609), a mode such that when it is detected that the external handset 20 has been connected, the call generating operation is executed even if the handset has been put on the charge table 910 is set (S610).

By inputting "1" (S609), a mode such that even when it is detected that the external handset 20 has been connected, the call generating operation cannot be executed so long as the handset is put on the charge table 910 is set (S611).

By further depressing the setting key (S603), a display to select the response mode appears on the display unit 115 (FIG. 7B). By inputting "0" here (S612), a mode such that when it is detected that the external handset 20 has been connected, the responding operation can be executed so long as the handset is put on the charge table 910 is set (S613).

By inputting "1" (S612), a mode such that even when it is detected that the external handset 20 has been connected, the responding operation cannot be performed so long as the handset is put on the charge table 910 is set (S614).

By further depressing the setting key (S604), the processing routine is released from the setting mode (S605).

The fourth embodiment of the invention will now be described.

FIG. 8 is a block diagram showing a system construction according to the fourth embodiment.

In the diagram, a main apparatus 801 encloses a plurality of external lines and a plurality of extensions and has an exchanging function and executes a whole control of the system. A line 802 is an extension of a PBX (private exchange), an ordinary subscriber's line, or the like.

An extension 803 is a line to connect radio telephone apparatuses 809 and 810 and a telephone 808 exclusively used for extension. An office line interface 804 encloses the line 802 such as PBX extension, ordinary subscriber's line, or the like. A telephone interface 805 exclusively used for extension encloses the telephone 808 exclusively used for extension.

A control unit 807 controls a speech communication path 806, the office line interface 804, and the extension interface 805 and also controls the call generation and reception and response of the radio telephone apparatus to which the external handset is connected.

The radio telephone apparatus comprises: the fixed equipment 809 connected to the main apparatus 801; and the moving equipment 810 that is connected to the fixed equipment 809 by a radio wave.

In the embodiment, the call generation and reception and response of the radio telephone apparatus is set by the telephone 808 exclusively used for extension and its procedure is similar to that of the flowchart shown in FIG. 6. Information that is displayed in the telephone 808 is also similar to that shown in FIGS. 7A to 7C.

The data set as mentioned above is stored into the control unit 807 of the main apparatus 801 and controls the operation of the radio telephone apparatus.

Even when the set data is transferred to the moving equipment 810 through the fixed equipment 809 and the call generation and reception and response is controlled in the moving equipment 810, a similar effect is obtained.

Even when data is input from a data terminal equipment that can be connected to the main apparatus 801 in order to set the data, a similar effect can be also derived.

In the above embodiments, when the connection is detected by the connection detection unit 110 or 510, the voice switching unit 104 or 504 is switched. However, the voice switching section can be also switched and connected on the basis of an instruction of the key pad 114.

Although the present invention has been described above with respect to the preferred embodiments, the invention is not limited to the foregoing embodiments but many modifications and variations are possible within the spirit and scope of the appended claims of the invention.

What is claimed is:

1. A radio communication apparatus comprising:

connecting means for connecting another communication apparatus;

radio communicating means for communicating a communication signal of said another communication apparatus through a radio line; and control means for determining, in response to a connection of said radio communication apparatus and a charge table, whether to continue or terminate communication by said radio communicating means in accordance with whether said another communication apparatus has been connected to said connecting means or not, and continuing or terminating the communication based upon said determination.

2. An apparatus according to claim 1, wherein said radio communication means includes a handset, and a switch for selectively connecting another communication apparatus or said handset to the radio line in accordance with whether said another communication apparatus is connected to said connecting means.

3. A radio communication apparatus comprising:

connecting means for connecting another communication apparatus;

radio communicating means for communicating a communication signal of said another communication apparatus through a radio line;

input means for inputting an instruction to start a communication; and deciding means for deciding whether the communication by said radio communicating means is started or not in accordance with whether said another communication apparatus has been connected to said connecting means or not when the instruction to start the communication is input from said input means, wherein the instruction to start the communication is ignored in a case where said another communication apparatus has not been connected to said connecting means.

4. An apparatus according to claim 3, wherein said radio communication means includes a handset, and a switch for selectively connecting another communication apparatus or said handset to the radio line in accordance with whether said another communication apparatus is connected to said connecting means.

5. An apparatus according to claim 3, wherein said deciding means decides whether the communication is started or not in accordance with whether said another communication apparatus has been connected to said connecting means or not when the instruction to start the communication is input in a case where the radio communication apparatus has been connected to a charger, and wherein the instruction is ignored in a case where said another communication apparatus has not been connected to said connecting means and the radio communication apparatus has been connected to the charger.

6. An apparatus according to claim 3, wherein the communication is started in spite of whether said another communication apparatus has been connected to said connecting means or not when the instruction to start the communication is input in a case where the radio communication apparatus has not been connected to a charger.

7. A control method of a radio communication apparatus to which another communication apparatus can be connected and which communicates a communication signal of said another communication apparatus through a radio line, comprising the steps of:

judging whether a charge table has been connected or not;

judging whether said another communication apparatus has been connected or not;

deciding, in response to a connection of said charge table, whether radio communication is finished or not in accordance with whether said another communication apparatus has been connected or not; and terminating or continuing the radio communication based upon said decision.

8. A method according to claim 7, wherein said another communication apparatus or a handset of the radio communication apparatus is connected to the radio line in said second judging step, in accordance with whether said another communication apparatus has been connected.

9. A radio communication apparatus comprising:

connecting means for connecting another communication apparatus;

radio communicating means for communicating a communication signal of said another communication apparatus through a radio line:

selecting means for selecting whether said radio communicating means executes communication or not in accordance with whether said another communication apparatus has been connected to said connecting means or not, in response to a connection of said radio communication apparatus and a charge table; and control means for controlling a charge current by said charge table in accordance with whether said radio communicating means is communicating or not.

10. An apparatus according to claim 9, wherein said radio communication means includes a handset, and a switch for selectively connecting another communication apparatus or said handset to the radio line in accordance with whether said another communication apparatus is connected to said connecting means.

11. A radio communication system including:

(A) a communication unit;

(B) a charger unit; and (C) a radio communication apparatus, comprising (c1) first connecting means for connecting the communication unit to the radio communication apparatus, (c2) second connecting means for connecting the charger to the radio communication apparatus, (c3) radio communicating means for communicating a radio signal through a radio line, (c4) selecting means for selecting whether a radio communication should be terminated or not in accordance with whether the communication unit has been connected to said first connecting means, in response to a connection of the charger, and (c5) control means for terminating or continuing said radio communication based upon a result determined by said selecting means.

12. A system according to claim 11, wherein said radio communication means includes a handset and a switch for selectively connecting said communication unit or said handset to the radio line in accordance with whether said communication unit is connected to said first connecting means.

13. A control method of a radio communication apparatus to which another communication apparatus can be connected and which communicates a communication signal of said another communication apparatus through a radio line, comprising the steps of:

judging whether another communication apparatus has been connected to the radio communication apparatus or not;

detecting an instruction to start a communication; and deciding whether a radio communication should be started or not in accordance with whether said another communication apparatus has been connected or not when the instruction to start the communication is detected, wherein the instruction to start the communication is ignored in a case where said another communication apparatus has not been connected.

14. A method according to claim 13, wherein whether the radio communication should be started or not is decided in said deciding step, in accordance with whether said another communication apparatus has been connected or not when the instruction to start the communication is detected in a case where the radio communication apparatus has been connected to a charger, wherein the instruction is ignored in a case where said another communication apparatus has not been connected and the radio communication apparatus has been connected to the charger.

15. A method according to claim 13, wherein the radio communication is started in spite of whether said another communication apparatus has been connected or not when the instruction to start the communication is detected in a case where the radio communication apparatus has not been connected to a charger.

* * * * *